United States Patent [19]

Nakadai et al.

[11] Patent Number: 5,928,454
[45] Date of Patent: Jul. 27, 1999

[54] LAMINATING METHOD FOR A THERMAL RECORDING PAPER AND LAMINATING DEVICE FOR THE SAME

[75] Inventors: Katsuo Nakadai; Nobuo Katsuma, both of Saitama, Japan

[73] Assignee: Fuji Photo Film Co., Ltd., Kanagawa, Japan

[21] Appl. No.: 08/917,719

[22] Filed: Aug. 27, 1997

[30] Foreign Application Priority Data

Aug. 28, 1996 [JP] Japan .................................. 8-226664

[51] Int. Cl.⁶ ...................................................... B32B 31/00
[52] U.S. Cl. .................. 156/275.5; 156/277; 156/272.2; 156/272.6; 156/274.8; 427/152
[58] Field of Search ............................ 427/152; 428/404, 428/336, 323, 211, 481, 511, 535; 156/275.7, 277, 272.2, 272.6, 274.4, 274.8, 275.5

[56] References Cited

U.S. PATENT DOCUMENTS 4,505,975  3/1985  Majima ...................................... 428/336
5,407,724  4/1995  Mimura et al. ........................... 428/141
5,585,321  12/1996  Breen et al. .............................. 503/226

*Primary Examiner*—Merrick Dixon
*Attorney, Agent, or Firm*—Sughrue, Mion, Zinn, Macpeak & Seas, PLLC

[57] ABSTRACT

A color thermal recording paper and a laminate sheet are pressed by urging of a press roller toward a transporting roller so as to contact each other tightly. When the recording paper and the laminate sheet pass by a ultraviolet lamp, ultraviolet rays are applied to them. The ultraviolet rays passes through a transparent sheet layer of the laminate sheet and is absorbed into an adhesive layer disposed under the transparent sheet layer. Ultraviolet-curing adhesive agents constituting the adhesive layer are hardened by the energy of the ultraviolet rays so that the adhesive layer is integrally adhered to a protect layer of the recording paper without gap. When the recording paper and the laminate sheet are adhered, heat is not used so that a cyan heat sensitive color layer of the recording paper which is not fixed by the ultraviolet rays is prevented from coloring. Accordingly, a recorded image is not changed in quality.

3 Claims, 3 Drawing Sheets

LAMINATING METHOD FOR A THERMAL RECORDING PAPER AND LAMINATING DEVICE FOR THE SAME

BACKGROUND OF THE INVENTION

1. Field of the Invention

The present invention relates to a laminating method and a laminating device for performing lamination for a thermal recording paper.

2. Description of the Related Art

As to thermal recording, there are a heat transfer recording method and a heat sensitive recording method. In the heat transfer recording method, an ink ribbon or an ink sheet is overlapped on a recording paper. The ink ribbon or the ink sheet is pressed and heated by a thermal head from the back thereof to transfer ink on the recording paper. As to the heat transfer recording method, there are a fusion transfer type and a sublimation transfer type. on the other hand, in the heat sensitive recording method, a thermal recording paper in which a heat sensitive color layer is formed on a base member is used. The recording paper is colored by being heated with a thermal head to record an image or the like.

With respect to a color thermal recording paper, as shown in FIG. 4, a color thermal recording paper 1 in which a color layer 7 is superimposed on a base member 2 is well known. The color layer 7 comprises a cyan heat sensitive color layer 3, a magenta heat sensitive color layer 4, an yellow heat sensitive color layer 5 and a protect layer 6. Each of the color layers has different heat sensitivity and the heat sensitivity is highest for the upper layer. Utilizing the difference of the heat sensitivity, the recording is performed from the most upper layer in order, adjusting a range of heat energy of the thermal head. Before the next lower layer is recorded, the recorded color layer is optically fixed by radiating ultraviolet rays so as not to color again. The yellow heat sensitive color layer 5, which is most upper layer, is optically fixed by the ultraviolet rays of 420 nm. The magenta heat sensitive color layer 4 is optically fixed by the ultraviolet rays of 365 nm. For the cyan heat sensitive color layer 3, fixing property is not given because it has low heat sensitivity (coloring point of it is high) and is not colored under normal environment.

In the heat transfer recording of the sublimation transfer type, lamination is carried out in order to reduce discoloration and fading of the recording paper and to protect against damaging a surface of the recording paper. The lamination is carried out in a following manner. A laminate sheet in which heat-softening adhesive agent is spread on a transparent resin sheet is overlapped on the surface of the recording paper. The laminate sheet is pressed by a press roller, being heated with a heater or the like so that the adhesive agent is melted and the laminate sheet is adhered to the surface of the recording paper.

Further, due to the lamination, ruggedness caused on the surface of the recording paper during the printing is covered with the laminate sheet and the surface is smoothed. Accordingly, an advantage that gloss of the surface may be improved is obtained besides the forgoing effect that the surface of the recording paper is protected and the discoloration is reduced.

However, when the lamination as described above is carried out on the thermal recording paper, if the heat-softening adhesive agent is heated at higher temperature than softening temperature, unfixed heat sensitive color layer may be colored. Therefore, there arises a problem in that an image or the like already recorded is injured.

Moreover, if the thermal recording paper is heated at high temperature, small bubbles are sometimes generated from the heat sensitive color layer. At this time, the surface of the thermal recording paper becomes a blister state.

SUMMARY OF THE INVENTION

In view of the foregoing, it is a primary object of the present invention to provide a laminating method and a laminating device for a thermal recording paper in which the recording paper is laminated without injuring an image which is thermally recorded on the recording paper.

It is a second object of the present invention to provide a laminating method and a laminating device for a thermal recording paper in which it is not necessary to heat a laminate sheet when the laminate sheet is adhered to the recording paper.

In order to active the above and other objects, the laminating method and the laminating device for the thermal recording paper use a laminate sheet in which an adhesive layer hardened by ultraviolet rays is provided. The adhesive layer is a layer of ultraviolet-curing adhesive agents which are hardened by energy of the ultraviolet rays.

In a preferred embodiment, the laminate sheet comprises the adhesive layer and a transparent sheet layer. The adhesive layer is transparent and covered with a release paper.

When lamination is carried out, at first, the release paper is peeled from the laminate sheet and the laminate sheet is superimposed on the thermal recording paper. At this time, the adhesive layer of the laminate sheet is put on a heat sensitive color layer side of the recording paper. The laminate sheet and the recording paper are pressed by press means so that the laminate sheet comes into contact with the recording paper tightly.

In this state, the laminate sheet and the recording paper are transported and pass by a ultraviolet lamp radiating the ultraviolet rays. When the laminate sheet passes by the ultraviolet lamp, the ultraviolet rays are applied to the laminate sheet. The ultraviolet rays pass through the transparent layer of the laminate sheet and are absorbed into the adhesive layer disposed under the transparent layer. Due to the energy of the ultraviolet rays, the ultraviolet-curing adhesive agent constituting the adhesive layer is hardened. Accordingly, the laminate sheet is integrally adhered to the recording paper without gap.

According to the present invention, when the recording paper is laminated with the laminate sheet, it is unnecessary to heat them. Thus, it may be prevented that the unfixed color layer is colored by heat when the lamination is carried out. Further, as the heat is not used for the lamination, it may be also prevented that small bubbles are generated from the color layer.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 3:
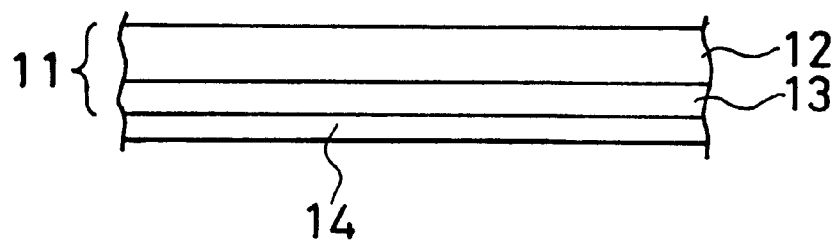
FIG. 3 is an explanatory illustration showing a layer structure of a laminate sheet.
Figure 4:
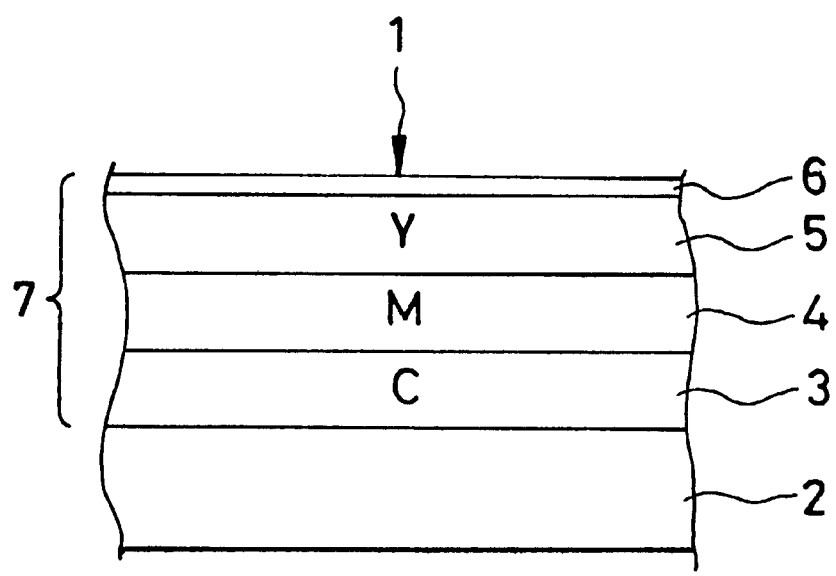
FIG. 4 is an explanatory illustration showing a layer structure of a color thermal recording paper.

FIG. 3 shows a layer structure of a laminate sheet used in the present invention. The laminate sheet 11 is constituted of a transparent sheet layer 12 and an adhesive layer 13. The adhesive layer 13 is covered with a release paper 14. The transparent sheet layer 12 is a resin layer having high clarity and high durability. As the resin, there are polyethylene, polypropylene, polyethylene terephthalate and so forth.

The adhesive layer 13 is a transparent layer of adhesive agents which are hardened by applying ultraviolet rays. The ultraviolet-curing adhesive agent is, for example, polyester acrylate, urethane acrylate, unsaturated polyester resin and epoxy resin. As to the adhesive agent constituting the adhesive layer 13, its viscosity is adjusted so as not to flow out of the sheet layer 12 at normal temperature and so as to spread on the rear face of the sheet layer 12 uniformly, keeping suitable viscosity.

The release paper 14 is an opaque sheet for preventing the adhesive layer 13 from being exposed to the light including ultraviolet rays. Further, the release paper 14 prevents dust from sticking to the adhesive layer 13. When the lamination is performed, the release paper 14 is peeled off from the laminate sheet 11.

Figure 2:
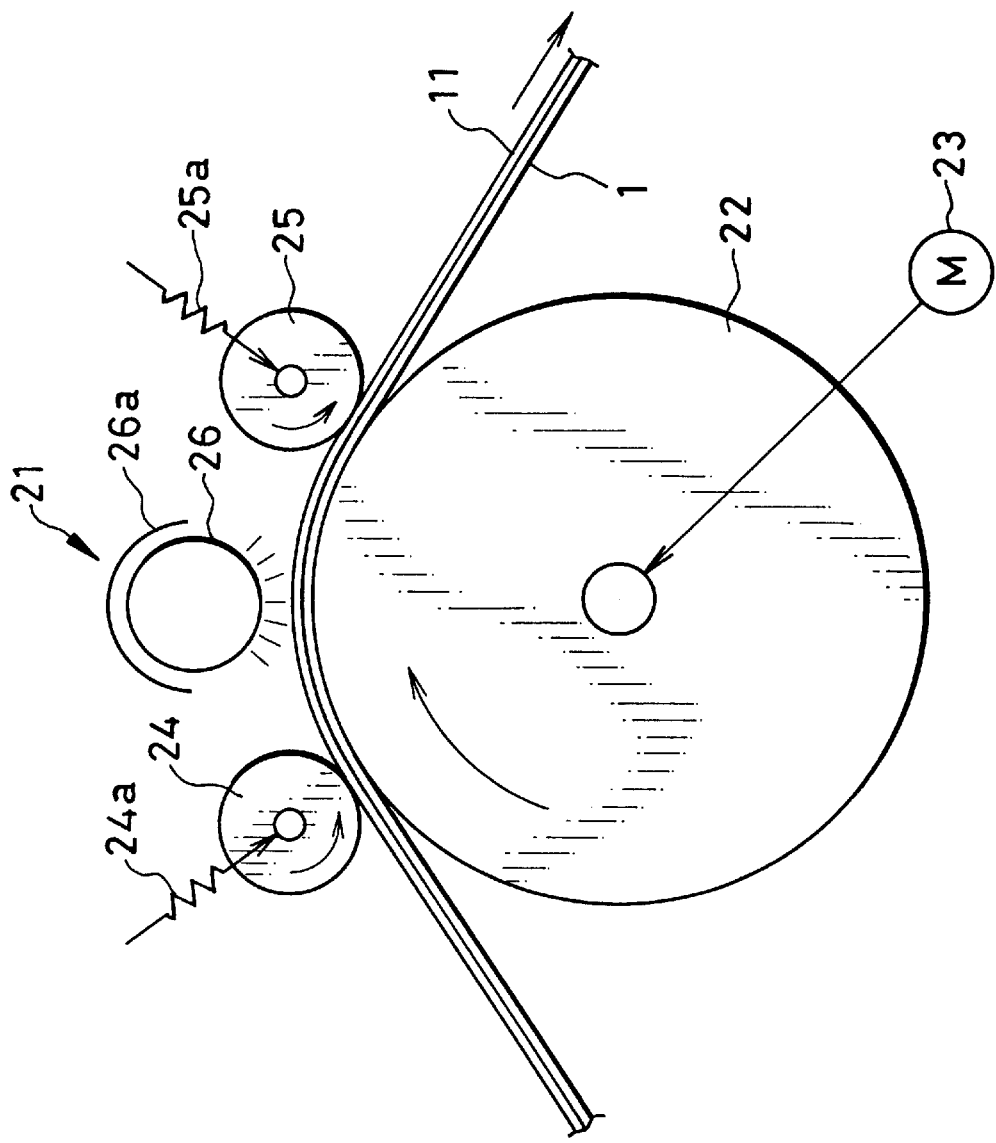
FIG. 2 is an explanatory illustration showing an embodiment of a laminating device according to the present invention.

In FIG. 2, a laminating device 21 is constituted of a transporting roller 22, a motor 23 for driving the transporting roller 22, press rollers 24 and 25, and an ultraviolet lamp 26. The transporting roller 22 is rotated in clockwise direction in FIG. 2 and transports a color thermal recording paper 1 with the laminate sheet 11 overlapped thereon from the press roller 24 to the press roller 25 via the ultraviolet lamp 26.

The press rollers 24 and 25 are respectively urged by springs 24a and 25a toward the transporting roller 22 and provided at an upstream side and a downstream side relative to the ultraviolet lamp 26. The press rollers 24 and 25 are free to rotate and press the laminate sheet 11 against the recording paper 1 so that the adhesive layer 13 of the laminate sheet 11 comes into contact with a protect layer 6 of the recording paper 1 without a gap.

The ultraviolet lamp 26 radiates the ultraviolet rays of suitable wavelength band for hardening the adhesive agent constituting the adhesive layer 13. By the way, reference numeral 26a denotes a reflector for reflecting the ultraviolet rays radiated from the ultraviolet lamp 26 efficiently toward the laminate sheet 11.

Figure 1:
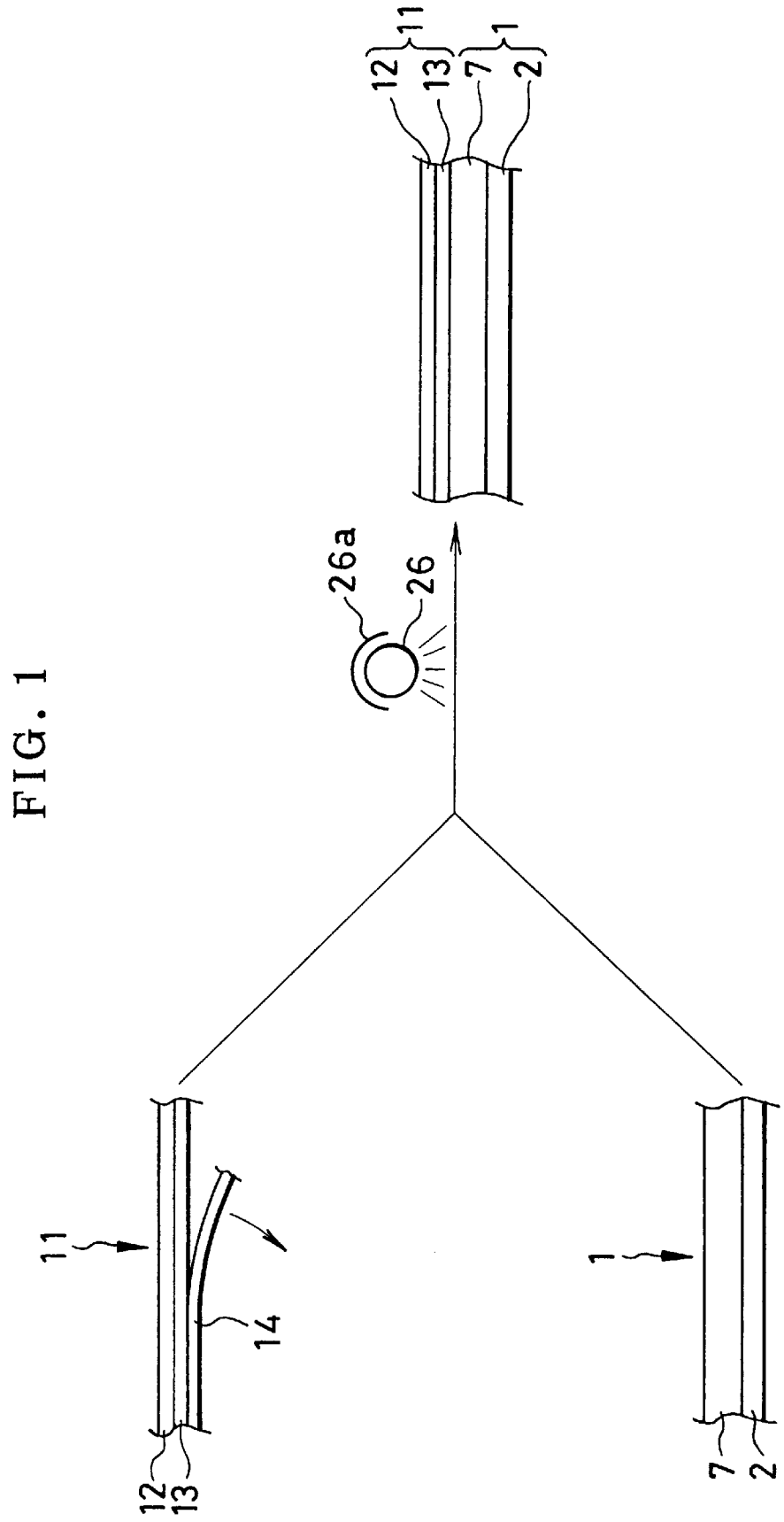
FIG. 1 is an explanatory illustration showing an embodiment of a laminating method according to the present invention.

Next, operation of the above-mentioned device is described. For example, when the lamination is performed for the recording paper 1 in which a full color image is recorded with the color thermal printer, at first, the release paper 14 protecting the adhesive layer 13 of the laminate sheet 11 is peeled from the laminate sheet 11 as shown in FIG. 1. Successively, the laminate sheet 11 is superimposed on the recording paper 1 such that the adhesive layer 13 is put on a color layer 7 of the recording paper 1.

Upon turning on a main switch (not shown) of the laminating device 21, the recording paper 1 and the laminate sheet 11 are inserted into the laminating device 21 in a state that the laminate sheet 11 faces the above direction. The motor 23 is actuated to rotate the transporting roller 22 in clockwise direction in FIG. 2 so that the recording paper 1 and the laminate sheet 11 are sent to the press roller 24.

When the recording paper 1 and the laminate sheet 11 reach the press roller 24, they are pressed toward the transporting roller 22 due to urging of the press roller 24. Accordingly, the adhesive layer 13 of the laminate sheet 11 comes into contact with the protect layer 6 of the recording paper 1 tightly so that small bubbles and the like caught between the adhesive layer 13 and the protect layer 6 are pushed out from a periphery thereof.

The recording paper 1 and the laminate sheet 11 contacted each other reach to under the ultraviolet lamp 26 from a leading edge portion thereof in order. At this place, the ultraviolet rays are applied to whole face of the laminate sheet 11. The ultraviolet rays radiated from the lamp 26 pass through the transparent sheet layer 12 of the laminate sheet 11 and are absorbed into the adhesive layer 13 disposed under the transparent sheet layer 12. The adhesive layer 13, to which the ultraviolet rays are applied, is hardened because the ultraviolet-curing adhesive agent, which is a constituting material of the adhesive layer 13, is hardened by the energy of the ultraviolet rays. Thus, the adhesive layer 13 is perfectly adhered to the protect layer 6 of the recording paper 1 without gap.

The laminated recording paper 1 is pressed toward the transporting roller 22 by the press roller 25 from the leading edge portion thereof in order again so that the adhesion of the recording paper 1 and the laminate sheet 11 is secured. Successively, the laminated recording paper 1 is discharged from the laminating device 21 and a sequence of laminating processes is completed.

As to the recording paper 1 laminated in such a manner, the surface of the color layer 7 is covered with the durable laminate sheet 11 so that the color layer 7 is not injured. Further, the discoloration and the fading of the recorded image due to the light is reduced so that vivid color is kept for a long time.

Moreover, by performing the lamination for the recording paper 1, ruggedness caused on the surface of the recording paper during the printing is covered with the laminate sheet 11 so that the surface thereof is smoothed. Accordingly, gloss of the surface is improved and quality of print is also improved.

By the way, in the above-described embodiment, a plurality of press rollers are provided at both sides of the ultraviolet lamp, however, it is possible to perform by only one press roller. In this case, the press roller is disposed before a position that the thermal recording paper covered with the laminate sheet reaches the ultraviolet lamp. The recording paper and the laminate sheet contacted by the press roller are sent to the ultraviolet lamp. As the recording paper and the laminate sheet are integrally adhered by means of the ultraviolet lamp, there is no problem in practical use if the recording sheet and the laminate sheet are not pressed after adhesion.

In the above-described embodiment, ultraviolet-fixing property is not given for the cyan heat sensitive color layer, however, the cyan heat sensitive color layer may have the property. At this time, if the adhesive agent of the laminate sheet is selected so as to be hardened by the ultraviolet rays whose wavelength band is same with that of the ultraviolet rays fixing the cyan heat sensitive color layer, the cyan heat sensitive color layer is fixed at the same time during the lamination.

Further, in the above-described embodiment, the lamination is performed for the color thermal recording paper as an example of the thermal recording paper. However, it is not exclusive. The lamination may be performed for a monochrome thermal recording paper and so on.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A laminating method for a thermal recording paper, said thermal recording paper having at least one heat sensitive color layer provided on a base member and an image being recorded in said heat sensitive color layer, said laminating method comprising the steps of:

superimposing a transparent laminate sheet on said thermal recording paper after recording said image in said heat sensitive color layer, said laminate sheet having an adhesive layer made of a ultraviolet-curing adhesive material, and said adhesive layer being put on said heat sensitive color layer side of said thermal recording paper; and applying ultraviolet rays to said laminate sheet, said ultraviolet-curing adhesive material curing and adhering said laminate sheet to said thermal recording paper.

2. A laminating method for a thermal recording paper according to claim 1, further comprising the step of:

peeling a release paper protecting said adhesive layer of said laminate sheet before superimposing said laminate sheet on said thermal recording paper.

3. A laminating method for a thermal recording paper according to claim 1, wherein said thermal recording paper has a cyan heat sensitive color layer, a magenta heat sensitive color layer and an yellow heat sensitive color layer which are provided on said base member in order, said cyan heat sensitive color layer having lowest heat sensitivity, and said magenta heat sensitive color layer and said yellow heat sensitive color layer being respectively fixed by ultraviolet rays of deferent wavelength band.

* * * * *